H. S. GOLIGHTLY & C. S. TWITCHELL.

Assignors to NEW HAVEN FOLDING-CHAIR CO.

Folding-Chair.

No. 8,470. Reissued Oct. 29, 1878.

Witnesses.

J. H. Chumway

C. A. Wilson

New Haven Folding Chair Co.,
assignees of
Henry S. Golightly & Chas. S. Twitchell.
Inventors.
By Atty.

Wm. Earle

N. PETERS, PHOTO-LITHOGRAPHER, WASHINGTON, D. C.

UNITED STATES PATENT OFFICE.

NEW HAVEN FOLDING CHAIR COMPANY, OF NEW HAVEN, CONNECTICUT, ASSIGNEE OF HENRY S. GOLIGHTLY AND CHARLES S. TWITCHELL, OF SAME PLACE.

IMPROVEMENT IN FOLDING CHAIRS.

Specification forming part of Letters Patent No. 37,864, dated March 10, 1863; Reissue No. 8,470, dated October 29, 1878; application filed July 1, 1878.

*To all whom it may concern:*

Be it known that HENRY S. GOLIGHTLY and CHAS. S. TWITCHELL, of New Haven, in the county of New Haven and State of Connecticut, did invent a new Improvement in Folding Chairs; and it is hereby declared that the following, when taken in connection with the accompanying drawings and the letters of reference marked thereon, is a full, clear, and exact description of the same, and which said drawings constitute part of this specification, and represent, in—

Figure 1:
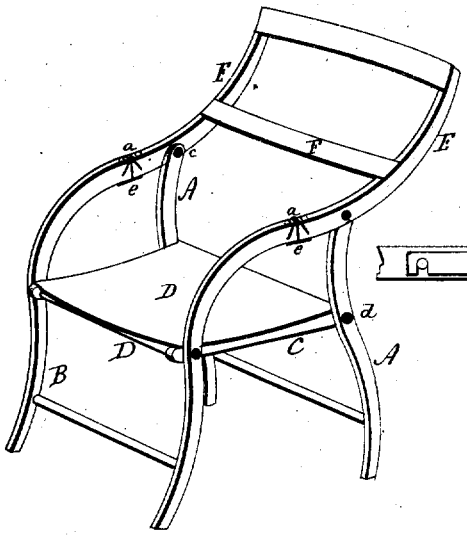
Figure 5:
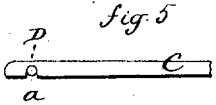
Figure 4:
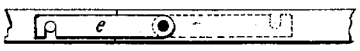
Figure 3:
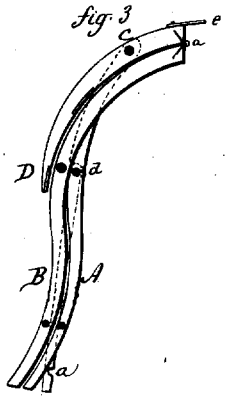
Figure 2:
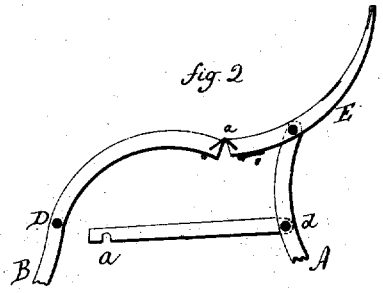

Figure 1, perspective view of a chair set up or open for use; Fig. 2, side view of the same unlocked, preparatory to folding; Fig. 3, side view of a chair folded. Figs. 4 and 5 illustrate the manner of locking the chair when set up.

This invention relates to an improvement in that class of chairs which are constructed so that they may be folded into a compact shape when not in use; and consists in the construction hereinafter described, and more particularly recited in the claims.

The chair consists, essentially, of two rear legs, A A, nearly vertical, and extending above the seat at the rear, and two front legs, B B, also vertical, or substantially parallel to the rear legs, extending above the seat at the front, and turned backward to form the arms. A seat-frame, C, hinged to the rear legs, as at *d*, and extending forward, rests upon and is supported by a rundle, D, between the front legs. The seat-frame has a notch, *o*, at each side, or its equivalent, to engage with the rundle D, so as to hold the front and rear legs in their proper relative positions. That portion E of the back above the upper end of the rear legs forms a continuation of the arms, and is hinged to the arms as at *a*, and to the upper end of the extension of the rear legs, as at *c*. Slats F extend across the back.

To firmly secure the chair in its set-up condition, a hook or latch, *e*, extends across the joint *a* from one part to the other, as seen in Fig. 4.

As thus constructed, to fold the chair, disengage the seat and bring the legs together substantially parallel—that is, preserving substantially the same parallelism with each other as when the chair is set up—and the parts will assume the position seen in Fig. 3. To set up the chair, reverse the operation.

What is claimed is—

1. In a folding chair, the rear legs extending downward from the rear of the seat, and to which the seat is hinged, the front legs extending above the seat at the front, and backward, the combination being substantially as described, and so that in folding the chair the front and rear legs come together in substantially a parallel condition.

2. In a folding chair, the seat hinged at the rear to the rear legs, which extend above the seat, the front legs extending upward above the seat at the front, and backward to form arms for the chair, substantially as described.

3. In a folding chair, the rear legs, extending above the seat at the rear, the front legs extending above the seat at the front, and backward to form the arms, combined with a folding seat, hinged to the rear legs, and a rundle or bar between the front legs to support the seat, substantially as described.

NEW HAVEN FOLDING CHAIR CO.,
*Assignee of Golightly & Twitchell, inventors.*
By ISAAC N. DANN, *President.*

Witnesses:
JOHN E. EARLE,
H. A. KITSON.